US008786673B2

(12) United States Patent
Cheng et al.

(10) Patent No.: US 8,786,673 B2
(45) Date of Patent: *Jul. 22, 2014

(54) SYSTEMS AND METHODS FOR PERFORMING VIDEO CONVERSION BASED ON NON-LINEAR STRETCH INFORMATION

(75) Inventors: Chih-Yu Cheng, Taipei (TW); Ho Chao Huang, New Taipei (TW); Wei-Hsin Tseng, New Taipei (TW)

(73) Assignee: Cyberlink Corp., Shindian, Taipei (TW)

( * ) Notice: Subject to any disclaimer, the term of this patent is extended or adjusted under 35 U.S.C. 154(b) by 801 days.

This patent is subject to a terminal disclaimer.

(21) Appl. No.: 12/986,524

(22) Filed: Jan. 7, 2011

(65) Prior Publication Data

US 2012/0176471 A1    Jul. 12, 2012

(51) Int. Cl.
*H04N 13/00*    (2006.01)
*H04N 13/02*    (2006.01)
*G06T 3/00*    (2006.01)
*H04N 5/262*    (2006.01)

(52) U.S. Cl.
CPC ....... *H04N 13/0264* (2013.01); *H04N 13/0029* (2013.01); *G06T 3/00* (2013.01); *H04N 13/0022* (2013.01); *H04N 5/2628* (2013.01); *H04N 13/026* (2013.01); *G06T 3/0012* (2013.01); *H04N 13/0271* (2013.01)
USPC ............. 348/43; 348/561; 348/565; 348/578; 348/580; 348/581; 348/583; 345/427; 345/582; 382/294; 382/298

(58) Field of Classification Search
CPC ............ G06K 9/00234; G06K 9/3241; G06K 9/6209; G06T 17/00; G06T 2207/10016; G06T 7/00; G06T 7/001; G06T 7/0024; G06T 7/0028; G06T 7/004; G06T 7/0042; G06T 7/0051; G06T 7/0061; G06T 7/0079; G06T 7/0081; G06T 7/0083; G06T 7/20; G06T 7/2006; G06T 7/60; H04N 13/0011; H04N 13/0014; H04N 13/0022; H04N 13/0221; H04N 13/0275; H04N 2013/0081; H04N 2013/0465; H04N 2213/003; H04N 2213/007; H04N 7/01; H04N 7/125; H04N 7/127
USPC ......... 382/154, 164, 285, 173, 118, 165, 275, 382/291, 181, 254, 298, 171, 174, 203, 225, 382/282, 288
See application file for complete search history.

(56) References Cited

U.S. PATENT DOCUMENTS

| 4,605,952 | A | 8/1986 | Powers |
| 5,329,309 | A | 7/1994 | Dorricott et al. |
| 6,674,484 | B1 * | 1/2004 | Boland et al. ................. 348/580 |
| 6,686,926 | B1 | 2/2004 | Kaye |
| 6,768,774 | B1 | 7/2004 | MacInnis et al. |

(Continued)

FOREIGN PATENT DOCUMENTS

WO    2009083863    9/2009

*Primary Examiner* — Sath V Perungavoor
*Assistant Examiner* — Dakshesh Parikh
(74) *Attorney, Agent, or Firm* — McClure, Qualey & Rodack, LLP (57) ABSTRACT

A method implemented in a computing system for converting two-dimensional (2D) video to three-dimensional (3D) format comprises sampling the 2D video, wherein the sampling is performed non-linearly in one or more directions. The method further comprises determining depth information of one or more objects within the 2D video based on sampling information and transforming the 2D video to a 3D-compatible format according to the sampling and the depth information.

25 Claims, 8 Drawing Sheets

(56) References Cited

U.S. PATENT DOCUMENTS

| | | |
|---|---|---|
| 7,027,081 B2 | 4/2006 | Kremen |
| 2004/0102245 A1 | 5/2004 | Escalera et al. |
| 2004/0183817 A1 | 9/2004 | Kaasila |
| 2004/0218269 A1* | 11/2004 | Divelbiss et al. ............. 359/464 |
| 2005/0180858 A1 | 8/2005 | Halgas, Jr. |
| 2006/0098867 A1* | 5/2006 | Gallagher ..................... 382/167 |
| 2006/0290708 A1 | 12/2006 | MacInnis et al. |
| 2007/0253677 A1 | 11/2007 | Wang |
| 2009/0027549 A1 | 1/2009 | Weisgerber |
| 2009/0116732 A1* | 5/2009 | Zhou et al. .................... 382/154 |
| 2010/0111417 A1* | 5/2010 | Ward et al. .................... 382/173 |

\* cited by examiner

SYSTEMS AND METHODS FOR PERFORMING VIDEO CONVERSION BASED ON NON-LINEAR STRETCH INFORMATION

BACKGROUND

Non-linear stretch techniques are commonly applied when the aspect ratio of video content is not consistent with that of the display device. However, one perceived shortcoming with conventional approaches to video aspect ratio conversion is that for display devices that are capable of displaying three-dimensional video, such techniques fail to utilize three-dimensional information to enhance the user's viewing experience.

SUMMARY

One embodiment, among others, is a method implemented in a computing system for converting two-dimensional (2D) video to a three-dimensional (3D) video. The method comprises sampling the 2D video, wherein the sampling is performed non-linearly in one or more directions. The method further comprises determining depth information of one or more objects within the 2D video based on sampling information and transforming the 2D video to a 3D-compatible format according to the sampling and the depth information.

Another embodiment is a video system for converting two-dimensional (2D) video to a three-dimensional (3D) video. The system comprises a sampling module configured to perform non-linear sampling of the 2D video, a depth processor configured to determine depth information relating to objects in the 2D video, a saliency region identifier configured to identify one or more regions of interest with a frame, wherein the sampling module is further configured to adjust a sampling density for the sampling based on a saliency region. The system further comprises a graphics renderer for rendering a 3D video according to the sampling density and the depth information.

According to another embodiment, a method that comprises defining a high saliency region, adjusting a sampling density according to the high saliency region and the depth information, determining depth information relating to objects within the high saliency region, sampling the 2D video according to the adjusted sampling density, transforming the 2D video to a 3D-compatible format according to the sampling and depth information, and outputting the transformed 2D video to a display device.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Various aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

Figure 1A:
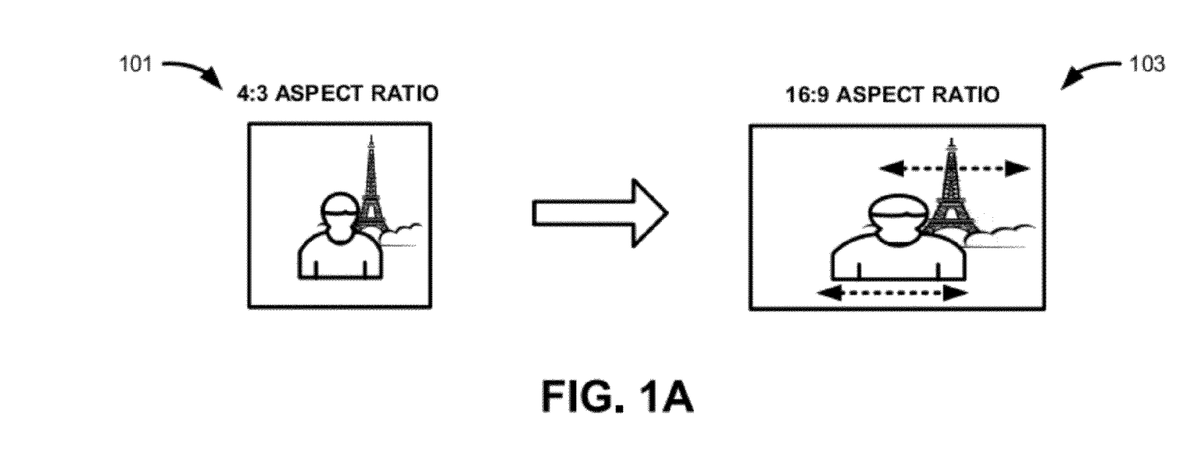
FIGS. 1A-B illustrate conversion of a video from one aspect ratio to a second aspect ratio.

Stretch techniques are commonly applied when the aspect ratio of video content is not consistent with that of the display device on which the video content is to be rendered. However, one perceived shortcoming with conventional approaches to video aspect ratio conversion is that for display devices that are capable of displaying three-dimensional video, such techniques generally fail to utilize three-dimensional information during the sampling process. Reference is made to FIG. 1A, which illustrates conversion of a video from one aspect ratio to a second aspect ratio. As illustrated in FIG. 1A, some scaling techniques involve a direct scaling from a starting aspect ratio (e.g., 4:3) to the target aspect ratio so that the rendered image fits the display, in this case, a 16:9 display. As such, object shape distortion generally occurs when directly mapping an object corresponding to one aspect ratio (e.g., 4:3, 16:9, 16:10, 1.85:1, 2.39:1 or 3:2) to another aspect ratio (e.g., 4:3, 16:9, 16:10, 1.85:1, 2.39:1 or 3:2).

Figure 1B:
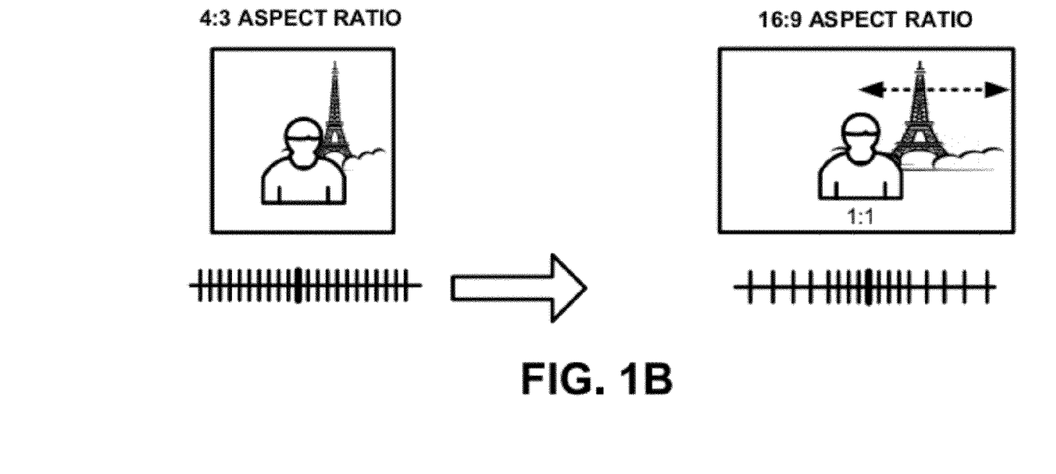

With reference to FIG. 1B, other scaling techniques incorporate non-linear scaling, whereby a portion of the 4:3 image, such as the middle portion, is left in its original state while the remaining portions of the 4:3 image are stretched to meet the target aspect ratio (e.g., 16:9). This is based on the assumption that a user generally focuses on the middle portion of a display. With such techniques, a portion of the resulting image is left undistorted while other portions such as the left and right portions are distorted. In cases where the left and right portions comprise mainly background objects and where the central portion comprises the object of interest, the object shape distortion effect is generally acceptable. Furthermore, such non-linear sampling techniques fail to utilize depth information.

Various embodiments are described for converting two-dimensional (2D) video content to a three-dimensional (3D) compatible format based on non-linear stretch techniques that leverages depth information. A 3D-compatible format can comprise any one of various formats, including, but not limited to, a side-by-side format, a checkerboard format, a line interlaced format, a 2D-plus-depth format, anaglyph format, and a page-flipping format, wherein the side-by-side comprises one of an over/under format and a left/right format. For some embodiments, the over/under format is utilized for postcard size prints, where the right eye print is positioned over the left eye print. Non-linear stretching is utilized when the aspect ratio of the 2D video is different from the aspect ratio of the rendering target to determine sampling information. The techniques described for converting 2D video to 3D video enhance users' viewing experience by reducing object shape distortion that results from mapping one aspect ratio to a second aspect ratio. One embodiment, among others, comprises non-linear sampling of the 2D video in at least one direction, where the directions comprise the x and y-directions. The method further comprises determining the depth information in the z-direction of at least one pixel according to the sampling process. Based on the determined depth information, the 2D video is converted to 3D format. As will be described in more detail later, some embodiments comprise adjusting the sampling density related to the sampling process according to a saliency region.

Figure 2:
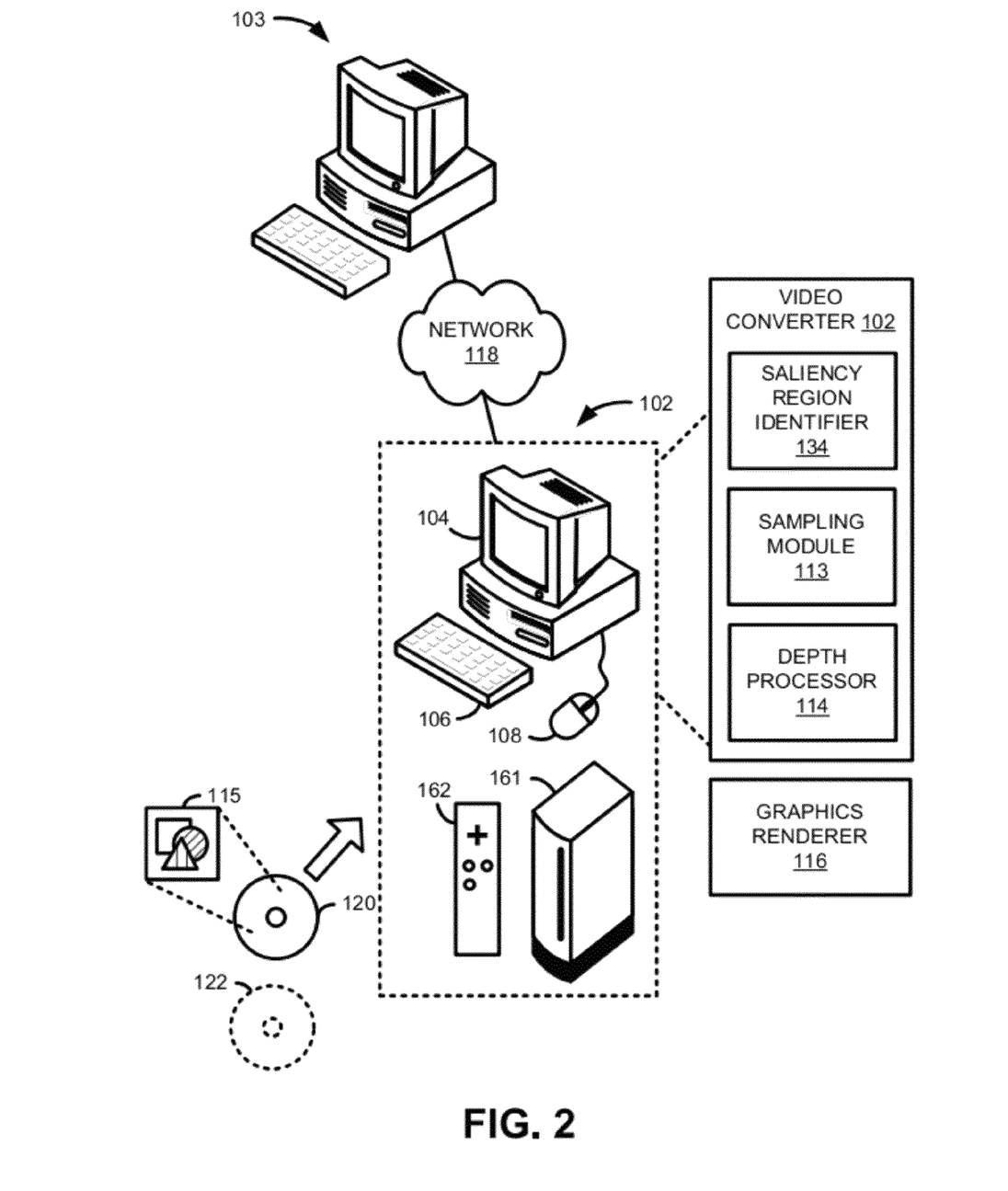
FIG. 2 depicts a top-level diagram of a video converter for converting two-dimensional video to three-dimensional video in accordance with various embodiments.

A description of a system for performing video conversion is now described followed by a discussion of the operation of the components within the system. FIG. 2 is a block diagram of an environment in which embodiments of a video converter 102 may be implemented. The video converter 102 that may be embodied, for example, as a desktop computer, computer workstation, laptop, or other computing platform. In other embodiments, the video converter 102 may be embodied as a video gaming console 161, which includes a video game controller 162 for receiving user preferences. For such embodiments, the video gaming console 161 may be connected to a television (not shown) or other display.

The video converter 102 includes a display 104 and input devices such as a keyboard 106 and a mouse 108. For some embodiments, the video converter 102 comprises a saliency region identifier 134, a sampling module 113, a depth processor 114, and a graphics renderer 116. As will be described in more detail later, the saliency region identifier 134 is configured to identify regions of interest within a particular frame. Based on the region identified/defined by the saliency region identifier 134 and also depth information obtained by the depth processor 114, the sampling module 113 adjusts the sampling density and samples the 2D video based on the sampling density. The depth processor 114 is configured to derive depth information for objects within the 2D video. The graphics renderer 116 then outputs the 3D video content to a display 104 after stretch and depth processing.

The video converter 102 in FIG. 2 is configured to receive video content 115 from various sources. For some implementations, the video content 115 is retrieved from a storage medium such as, for example, a Blu-ray disc (CD) 120, or other tangible storage medium. As one of ordinary skill will appreciate, the video content 115 may be encoded in various formats. As depicted in FIG. 2, the video converter 102 may also receive video content 115 directly from a digital camera 107 via a cable 111 or some other interface. The video converter 102 may support any one of a number of common computer interfaces, such as, but not limited to IEEE-1394 High Performance Serial Bus (Firewire), USB, a serial connection, and a parallel connection. The video converter 102 may also be coupled to a network 118, such as the Internet or a local area network (LAN). Through the network 118, the video converter 102 may receive video content 115 from another media display system 103. Utilizing the components described above, the video converter 102 converts two-dimensional (2D) video to three-dimensional (3D) format based on depth information. In general, the video converter 102 determines an order of objects relating in a frame within the 2D video, defines a high saliency region based on the order of the objects, and adjusts a sampling density according to the high saliency region. The video converter 102 is further configured to sample the 2D video according to the adjusted sampling density, transform the 2D video to a 3D-compatible format according to the sampling, and output the transformed 2D video to a display device 104.

Figure 3:
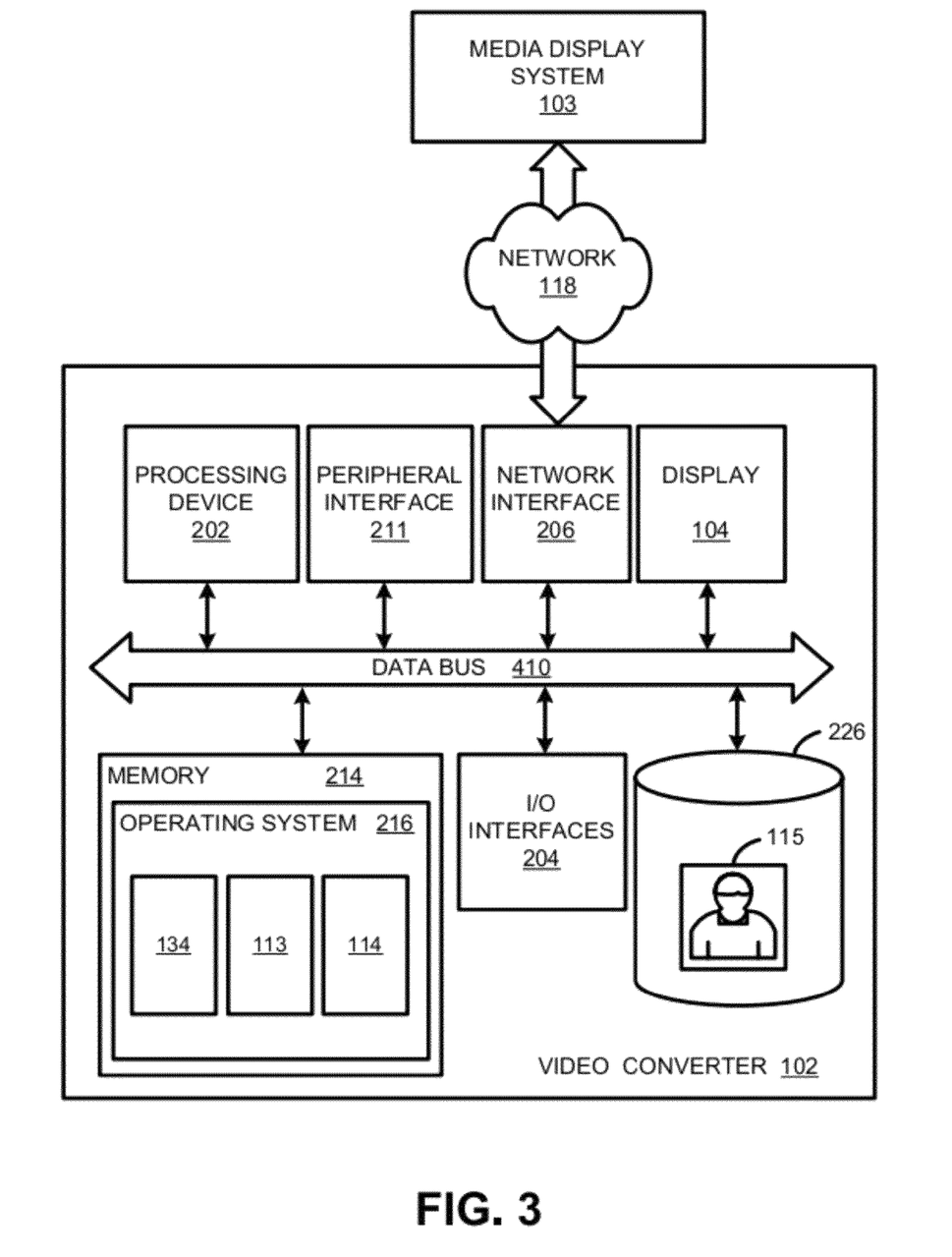
FIG. 3 illustrates additional components of the video converter shown in FIG. 2.

FIG. 3 illustrates an embodiment of the video converter 102 shown in FIG. 2. The video converter 102 may be embodied in any one of a wide variety of wired and/or wireless computing devices, such as a desktop computer, portable computer, dedicated server computer, multiprocessor computing device, smartphone, personal digital assistant (PDA), digital camera, and so forth. As shown in FIG. 3, the video converter 102 comprises memory 214, a processing device 202, a number of input/output interfaces 204, a network interface 206, a display 104, a peripheral interface 211, and mass storage 226, wherein each of these devices are connected across a local data bus 210.

The processing device 202 may include any custom made or commercially available processor, a central processing unit (CPU) or an auxiliary processor among several processors associated with the video converter 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 416, one or more native applications, emulation systems, or emulated applications for any of a variety of operating systems and/or emulated hardware platforms, emulated operating systems, etc. For example, the applications may include application specific software which may comprise some or all the components 134, 113, 114 of the video converter 102 depicted in FIG. 2. In accordance with such embodiments, the components are stored in memory 214 and executed by the processing device 202. One of ordinary skill in the art will appreciate that the memory 214 can, and typically will, comprise other components which have been omitted for purposes of brevity.

Input/output interfaces 204 provide any number of interfaces for the input and output of data. For example, where the video converter 102 comprises a personal computer, these components may interface with one or more user input devices 204, which may comprise a keyboard or a mouse, as shown in FIG. 2. The display 104 may comprise a computer monitor, a plasma screen for a PC, a liquid crystal display (LCD) on a hand held device, or other display device.

In the context of this disclosure, a computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

With further reference to FIG. 3, network interface device 206 comprises various components used to transmit and/or receive data over a network environment. For example, the network interface 206 may include a device that can communicate with both inputs and outputs, for instance, a modulator/demodulator (e.g., a modem), wireless (e.g., radio frequency (RF)) transceiver, a telephonic interface, a bridge, a router, network card, etc.). As shown in FIG. 3, the video converter 102 may communicate with one or more media display systems 103 via the network interface 206 over the network 118. The video converter 102 may further comprise mass storage 226 which stores such data as video content 115. The peripheral 211 interface supports various interfaces including, but not limited to IEEE-1394 High Performance Serial Bus (Firewire), USB, a serial connection, and a parallel connection.

Figure 4:
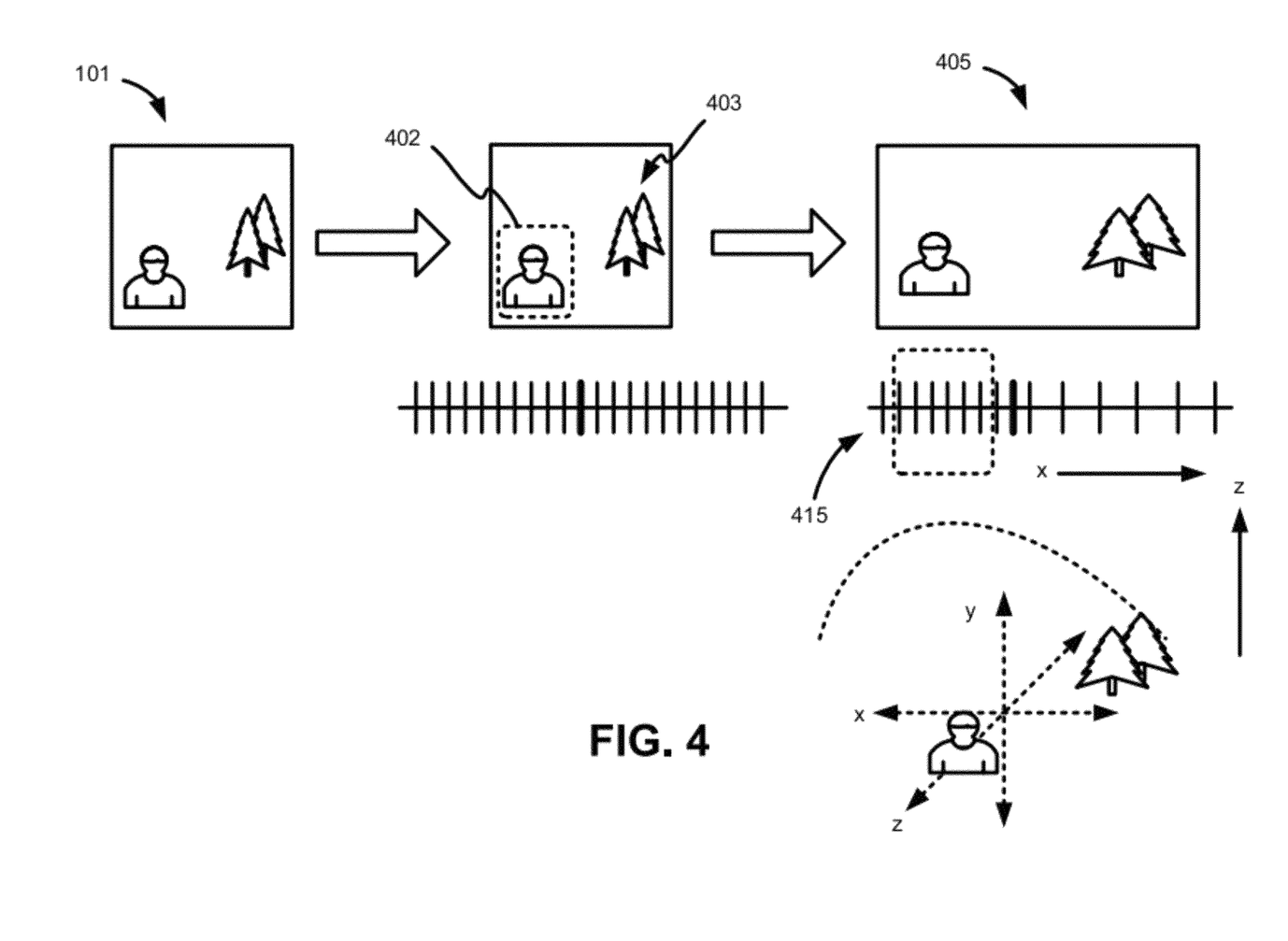
FIG. 4 illustrates non-linear stretching based on depth information within a saliency region.
Figure 5:
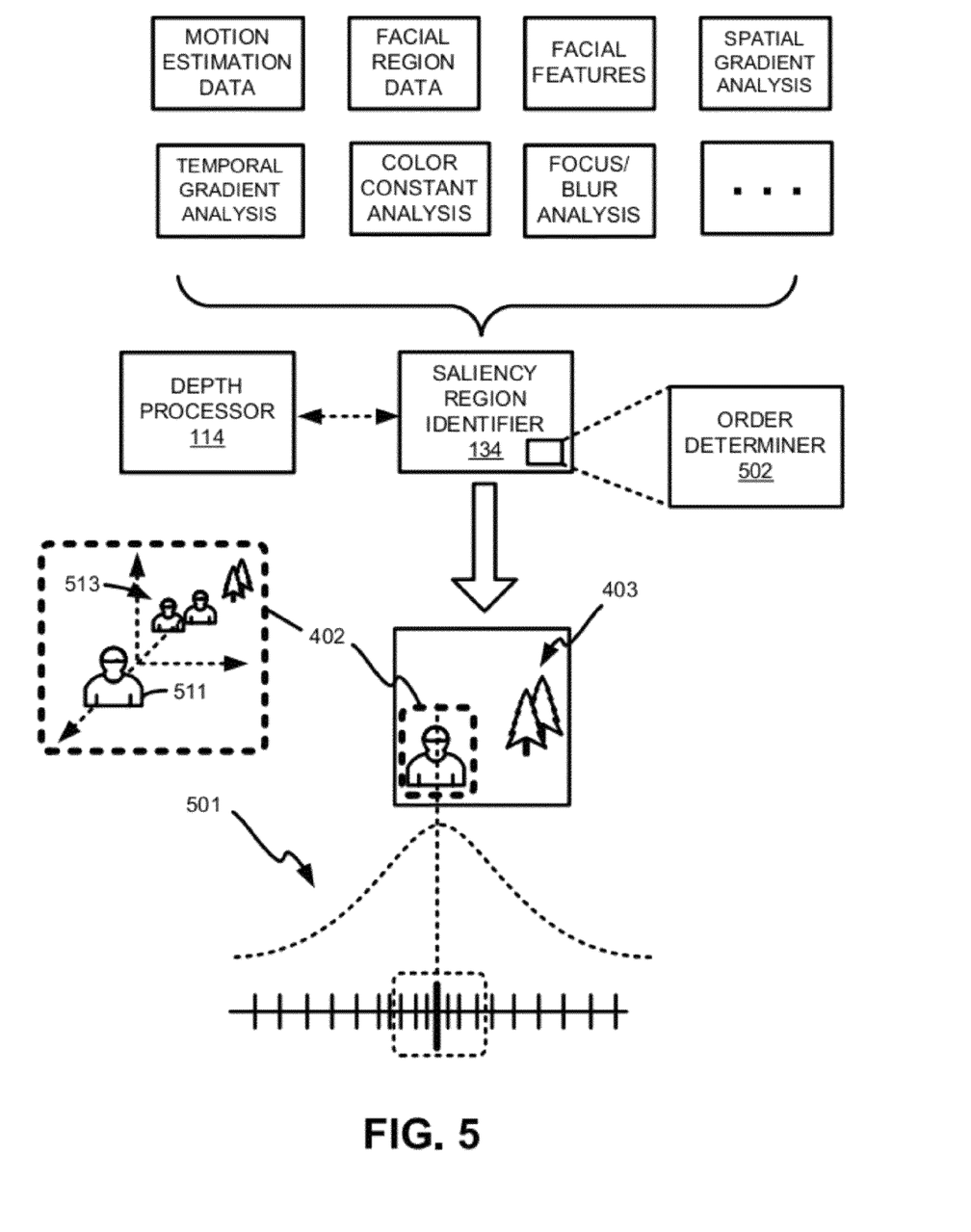
FIG. 5 illustrates how the saliency region may be derived based on various parameters and the adjustment of the sampling density.

FIG. 4 illustrates non-linear stretching based on a saliency region as performed in accordance with various embodiments. As described earlier, various embodiments comprise determining a saliency region within the frame to be sampled. For incoming video content (e.g., video content with a 4:3 aspect ratio), a region of high interest is identified, and based on the location of the identified saliency region 402 and based on depth information associated with objects 402, 403 within the 2D video, the sampling density is adjusted, as reflected by the sampling density scale 415 shown. For some embodiments, the sampling density is adjusted according to a projection type, which may comprise spherical projection or cylindrical projection, spheroid projection, quadratic projection or paraboloid projection. In the non-limiting example shown, the saliency region 402 is defined around the individual 402 rather than the background object 403. With reference to FIG. 5, the saliency region may be derived based on various factors or parameters. For example, the saliency region may be defined based on such information as motion estimation data, facial features, the degree of focus/blurring, color temperature of region, and contrast map. Facial features may include, but are not limited to, skin color, face position, hair color, facial shapes, and other attributes.

The contrast map may be defined according to one or more of the following: gradient analysis, color contrast, first order edge detection, second order edge detection, and frequency domain spectrum analysis of the 2D video 101. There are many methods for performing edge detection. Most of them can be grouped into two categories—search-based and zero-crossing based edge detection. The search-based methods detect edges by first computing a measure of edge strength, usually a first order derivative expression such as the gradient magnitude, and then searching for local directional maxima of the gradient magnitude using a computed estimate of the local orientation of the edge, usually the gradient direction. The zero-crossing based methods search for zero crossings in a second order derivative expression computed from the image in order to find edges, usually the zero-crossings of the Laplacian or the zero-crossings of a non-linear differential expression. As a pre-processing step to edge detection, a smoothing stage, typically Gaussian smoothing, is almost always applied.

Some implementations may utilize a predefined region as the saliency region. For example, a box region of a predefined size that is centrally located within the display may be utilized. Other implementations may incorporate a brightness map, which generally refers to a region where an associated luminous value exceeds the luminous dynamic range of the frame by a certain percentage. For some embodiments, the brightness map may be user-defined where the user specifies the percentage value (e.g., 50 percent). As a non-limiting example, any objects (or portion of the frame) with a luminous value that exceeds the luminous dynamic range by 50 percent is determined to be in the brightness map.

In accordance with some embodiments, depth information relating to objects 511, 513 within the saliency region 402 is derived by the depth processor 114 of FIG. 2. The sampling density is adjusted based on the saliency region 402 and depth information relating to objects 511, 513 within the saliency region 402. In this regard, depth processor 114 determines depth information of one or more objects within the 2D video based on sampling information The saliency region is defined based on one or more of the following attributes such as motion estimation data, facial features, degree of focus, a predefined central area (for example, an area in the central portion of the image designated as the saliency region), a brightness map, an order of objects, color temperature of region (for example, warm colors such red and yellow which correspond to the saliency region; cool colors such as blue and green which are outside the saliency region), and contrast map associated with the 2D video. The order of objects is determined according to a vanishing point technique based on lines, sizes of objects, motion of the objects, the presence of human features based on detection of one or more individuals within the 2D video, placement of objects with respect to landscape object, and an object's shadow. For some embodiments, an object covered by a shadow is determined to be father away and an occlusive relationship is determined to exist between objects.

In some implementations, the sampling density is directly proportional to the depth. For example, as the depth increases, the sampling density also increases. In other implementations, the sampling density is inversely proportional to the depth such that the depth increases as the sampling density decreases. The sampling density may be adjusted according to various functions. For some implementations, the sampling density on along the x-direction is adjusted to follow a spherical projection, cylindrical projection, spheroid projection, quadratic projection or paraboloid projection as shown in FIG. 5. The mean center of a sphere or the central axis of a cylinder is positioned to lie within the high saliency region. For example, the mean may be positioned to lie in the center of the saliency region 402 or at another predetermined location within the saliency region 402. Note that the sampling density converges to a 1:1 sampling relationship. For some embodiments, the depth processor 114 is configured to determine depth information of objects within the saliency region 402 if more than one object exists.

The depth information may then be utilized to position the mean of the sampling density function. For other embodiments, a patch-based method is incorporated, where a frame is split into many a plurality of sub-blocks, and a sampling density is assigned to each block according to its position. Note that the depth processor 114 determines depth information of one or more objects within the 2D video based on sampling information. The saliency region identifier 134 includes an order determiner 502 to determine the order of objects within a given frame. The order determiner 502 analyzes the content and determines the order of objects within a given frame. This may be performed based on various techniques. For some implementations, the saliency region identifier 134 utilizes a vanishing line/point method where straight lines within a frame are detected, and vanishing points along the lines are identified. Vanishing points relate to scenarios where an object is closer to a point far away from the viewer. The depth processor 114 determines the depth relationship of objects within the frame. The depth processor 114 may also be configured to determine depth information based on size of objects, where objects of larger size are assumed to be closer to the viewer.

The saliency region may also be identified based on motion, and specifically on local motion and/or global motion. Local motion is determined based on the difference between the motion of the object and global motion and may be used to define the saliency region. Global motion refers to motion that takes place opposite to that of the camera. Generally, it can be assumed that objects with more local motion are closer to the viewer. The saliency region identifier 134 may also be configured to analyze the relative position of objects within the display. Generally, objects located within the lower portion of a given frame have a higher probability of being closer to the viewer. Based on this, the depth processor 114 determines the depth information related to objects. As described earlier, the saliency region identifier 134 may identify or define regions of interest based on various pieces of information, including facial features (e.g., based on determination of one or more faces in the frame), facial size (e.g., larger sized faces may be used to identify a region of interest). For some implementations, the saliency region identifier 134 also analyzes facial features. In particular, when the saliency region identifier 134 identifies a region with the frame with facial features, the saliency region identifier 134 may be configured to conclude that the object corresponding to such facial features is more likely to be towards the front and closer to the viewer.

If a particular frame comprises a blue upper portion and a green lower portion, the saliency region identifier 134 may be configured to conclude that the lower portion relates to a landscape, while the upper portion of the frame relates to a blue sky. Based on this, the order determiner 502 within the saliency region identifier 134 may be configured to determine the ordering of objects based on a higher probability that objects located in the bottom portion are closer to the viewer. An occlusion technique may also be incorporated by the saliency region identifier 134, whereby for a given frame sequence, the saliency region identifier 134 utilizes motion estimation/edge and a matching process to determine an occlusive relationship (i.e., order) between objects.

Figure 6:
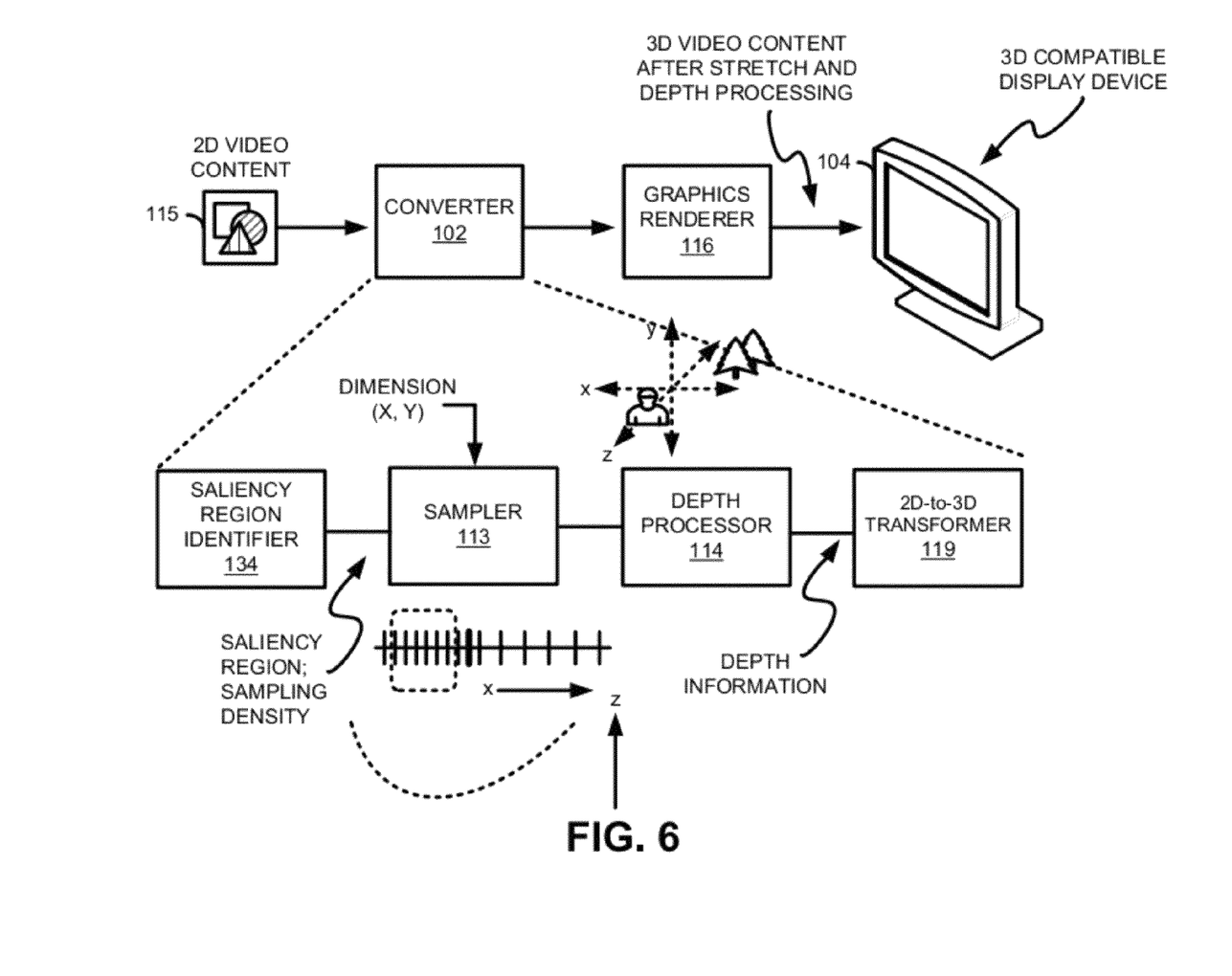
FIG. 6 shows the general process flow for converting video with the video converter in FIG. 2.
Figure 7:
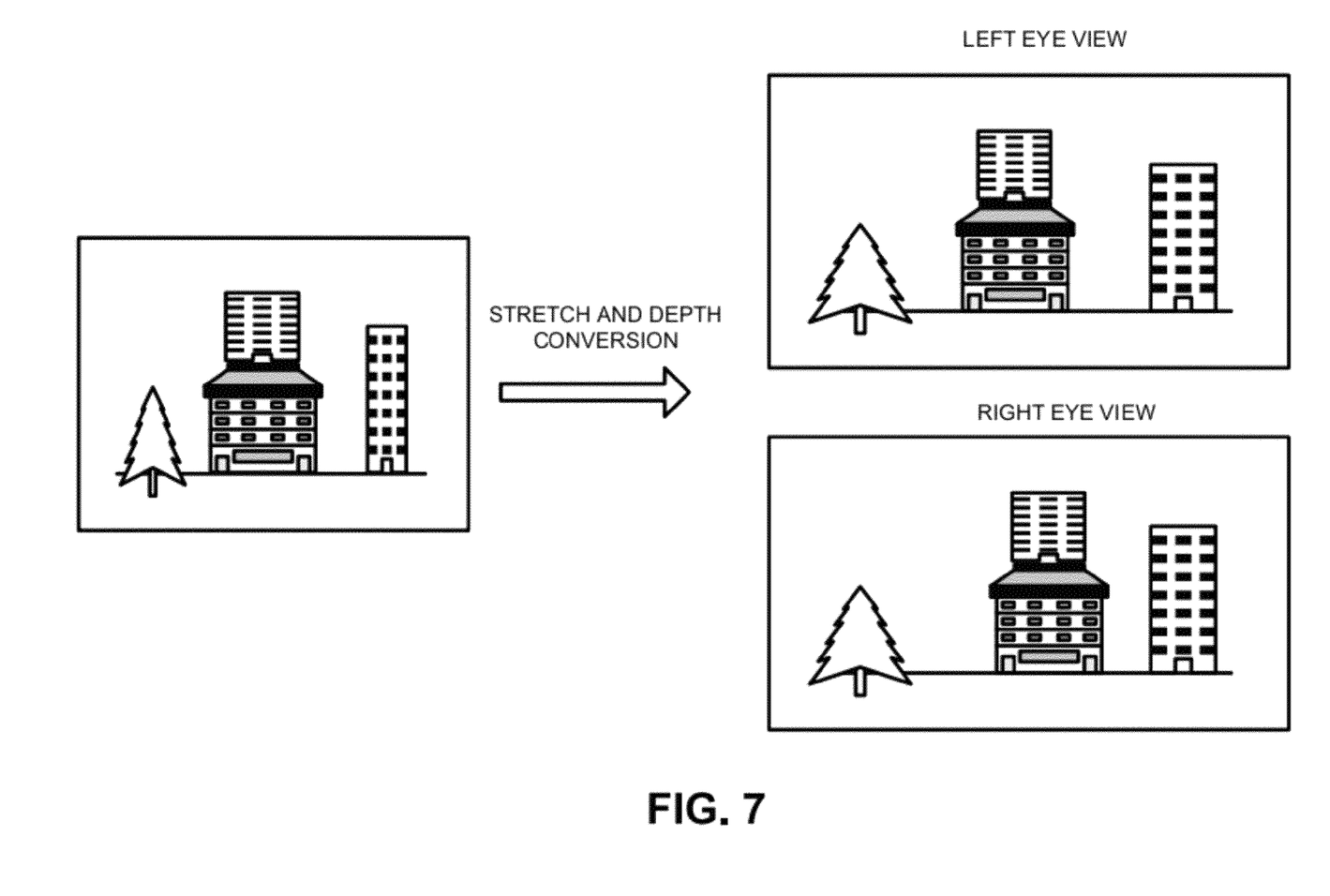
FIG. 7 shows the result of perform stretch and depth conversion in accordance with various embodiments.

FIG. 6 shows the general process flow for converting video with the video converter 102 in FIG. 2. Two-dimensional video content 115 is received at the video converter 102. The saliency region identifier 134 receives the two-dimensional video content 115 and determines one or more regions of interest. Based on the defined saliency region, the sampling module 113 adjusts the sampling density. For some implementations, the direction in which sampling is performed may be specified. For example, the sampling module 113 may be directed to sample pixels in the x-direction or y-direction. The depth processor 114 derives depth information from the 2D video 115. Component 119 then performs 2D-to-3D transformation on the content 115, and the graphics renderer 116 outputs the 3D content to a 3D-compatible display 104. FIG. 7 shows the result of perform stretch and depth conversion in accordance with the techniques described.

Figure 8:
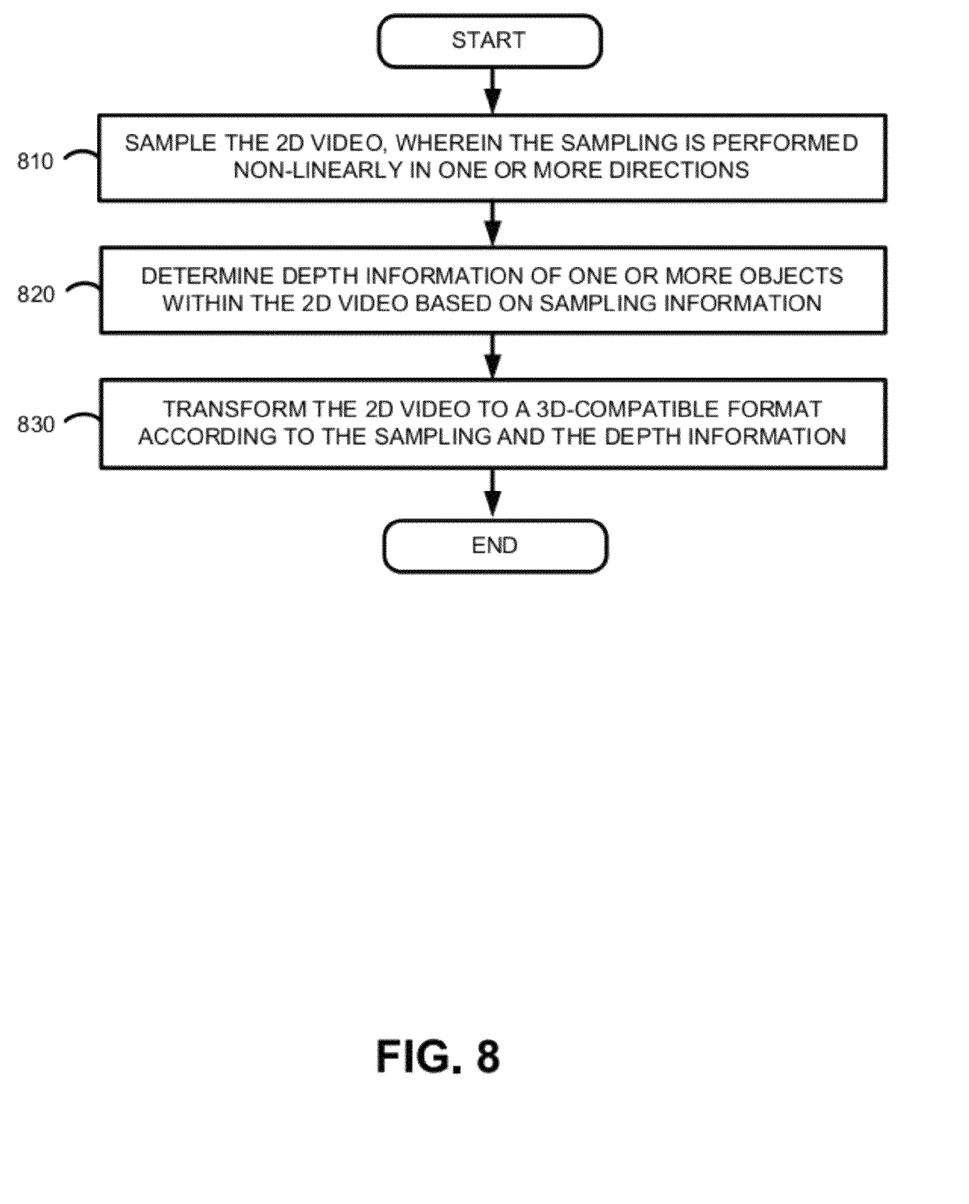
FIG. 8, which is a flow chart for a method implemented in the video converter of FIG. 2.

Reference is made to FIG. 8, which is a flow chart for a method implemented in the video converter 102 of FIG. 1. If embodied in software, each block depicted in FIG. 8 represents a module, segment, or portion of code that comprises program instructions to implement the specified logical function(s). In this regard, the program instructions may be embodied in the form of source code that comprises statements written in a programming language or machine code that comprises numerical instructions recognizable by a suitable execution system such as a processor in a computer system or other system such as the one shown in FIGS. 2-3. The machine code may be converted from the source code, etc. If embodied in hardware, each block may represent a circuit or a number of interconnected circuits to implement the specified logical function(s).

The process depicted in FIG. 8 is directed to converting 2D video to 3D format. Block 810 begins by sampling the 2D video 115, wherein the sampling is performed non-linearly in one or more directions. As described above in connection to FIG. 6, the sampling direction may be specified and input to the sampling module 113 of FIG. 6. In block 820, depth information relating to at least one of the samples is derived based on sampling information. In block 830, the 2D video is transformed to a 3D-compatible format according to the sampling and the depth information.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

The invention claimed is:

1. A method implemented in a computing system for converting two-dimensional (2D) video to three-dimensional (3D) video, comprising:
    sampling the 2D video according to a sampling density, wherein the sampling is performed non-linearly in one or more spatial directions, and wherein at least part of the sampling density is adjusted according to a saliency region;
    determining depth information of one or more objects within the 2D video based on sampling information; and
    transforming the 2D video to a 3D-compatible format according to the sampling and the depth information.

2. The method of claim 1, further comprising outputting a 3D-compatible video to a display device.

3. The method of claim 1, wherein 3D-compatible format comprises one of: a side-by-side format, a checkerboard format, a line interlaced format, a 2D-plus-depth format, anaglyph format, and a page-flipping format.

4. The method of claim 3, wherein the side-by-side format comprises one of: an over/under format and a left/right format.

5. The method of claim 1, wherein a sampling density for performing the non-linear sampling is adjusted according to a projection type.

6. The method of claim 5, wherein the projection type comprises one or more of: a spherical projection, a cylindrical projection, a spheroid projection, a quadratic projection, and a paraboloid projection.

7. The method of claim 1, wherein the depth increases as the sampling density increases.

8. The method of claim 1, wherein the depth increases as the sampling density decreases.

9. The method of claim 1, wherein the saliency region is defined based on one or more of the following attributes associated with the 2D video:
    motion estimation data;
    facial features;
    degree of focus;
    a predefined central area;
    a brightness map;
    an order of objects;
    a color temperature of region; and
    a contrast map.

10. The method of claim 9, wherein facial features comprise:
    location within the 2D video of one or more facial regions;
    skin color;

face position;
facial size; and
facial shapes.

11. The method of claim 9, wherein contrast map are defined according to one or more of:
gradient analysis;
color contrast;
edge analysis;
frequency domain spectrum analysis of the 2D video;
first order edge detection; and
second order edge detection.

12. The method of claim 11, wherein edge analysis is performed based on Sobel analysis, Canny analysis, or Prewitt analysis.

13. The method of claim 9, wherein determining the order of objects is performed based on one or more of the following:
a vanishing point technique based on lines;
sizes of objects;
motion of the objects;
a presence of human features;
placement of objects;
an object's shadow; and
occlusive relationships between objects.

14. The method of claim 1, wherein the non-linear sampling is performed according to an aspect ratio of the 2D video and an aspect ratio of a rendering target, wherein the aspect ratio of the rendering target is based on the aspect ratio of the display device.

15. A video system for converting two-dimensional (2D) video to three-dimensional (3D) format video, comprising:
a sampling module configured to perform non-linear sampling of the 2D video in one or more spatial directions according to a sampling density;
a depth processor configured to determine depth information relating to objects in the 2D video based on sampling information;
a saliency region identifier configured to identify one or more regions of interest with a frame, wherein the sampling module is further configured to adjust the sampling density for the sampling based on a saliency region; and
a graphics renderer for rendering a 3D video according to the sampling density and the depth information.

16. The system of claim 15, wherein the saliency region identifier identifies one or more regions of interest with the frame based on the order of objects.

17. The system of claim 15, wherein the sampling module adjusts the sampling density based on spherical projection or cylindrical projection such that the sampling density is maximized at approximately the middle of a high saliency region.

18. A method implemented in a computing system for converting two-dimensional (2D) video to three-dimensional (3D) video, comprising:
defining a high saliency region;
adjusting a sampling density according to the high saliency region and the depth information, wherein the sampling density is utilized for performing non-linear sampling in one or more spatial directions;
determining depth information relating to objects within the high saliency region based on sampling information;
sampling the 2D video according to the adjusted sampling density;
transforming the 2D video to a 3D-compatible format according to the sampling and depth information; and
outputting the transformed 2D video to a display device.

19. The method of claim 18, wherein 3D-compatible format comprises one of: a side-by-side format, an over/under format, a checkerboard format, a line interlaced format, a 2D-plus-depth format, anaglyph format, and a page-flipping format.

20. The method of claim 18, wherein the high saliency region is defined based on one or more of the following attributes:
motion estimation data associated with the objects in the frame;
facial features relating to the objects;
degree of focus and blurring in the frame;
a predefine central area;
a brightness map;
an order associated with the objects;
a color temperature of region; and
a contrast map.

21. The method of claim 18, wherein adjusting a sampling density according to the high saliency region comprises adjusting the sampling density according to one or more of: a spherical projection, a cylindrical projection, a spheroid projection, a quadratic projection, and a paraboloid projection.

22. The method of claim 21, wherein a mean associated with spherical projection or cylindrical projection corresponds to a position within the high saliency region.

23. The method of claim 22, wherein the mean associated with spherical projection or cylindrical projection corresponds to a center of the high saliency region.

24. The method of claim 21, further comprising:
determining an order of objects within the high saliency region;
positioning the mean based on a location of an object having a lowest depth within the high saliency region.

25. The method of claim 18, wherein adjusting a sampling density according to the high saliency region and the depth information comprises decreasing the sampling density as depth relating to objects decreases.

* * * * *